United States Patent
Xing

(10) Patent No.: US 11,418,472 B2
(45) Date of Patent: Aug. 16, 2022

(54) MESSAGE PROCESSING METHOD, APPARATUS AND DEVICE

(71) Applicant: Beijing Xiaomi Intelligent Technology Co., Ltd., Beijing (CN)

(72) Inventor: Dongyu Xing, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 22 days.

(21) Appl. No.: 16/686,160

(22) Filed: Nov. 17, 2019

(65) Prior Publication Data

US 2020/0396194 A1    Dec. 17, 2020

(30) Foreign Application Priority Data

Jun. 13, 2019    (CN) .......................... 201910512208.4

(51) Int. Cl.
*H04L 51/42* (2022.01)
*H04L 51/10* (2022.01)
*H04L 51/00* (2022.01)

(52) U.S. Cl.
CPC .............. *H04L 51/22* (2013.01); *H04L 51/10* (2013.01); *H04L 51/16* (2013.01)

(58) Field of Classification Search
CPC .......... H04L 51/22; H04L 51/16; H04L 51/10
USPC ....................................................... 709/206
See application file for complete search history.

(56) References Cited

U.S. PATENT DOCUMENTS

| | | | | |
|---|---|---|---|---|
| 2009/0252305 A1* | 10/2009 | Rohde | ................... | H04M 1/247 379/88.13 |
| 2009/0254829 A1* | 10/2009 | Rohde | ................... | G06F 3/0481 715/727 |
| 2013/0166660 A1* | 6/2013 | Chung | ................... | H04L 51/08 709/206 |
| 2013/0191460 A1* | 7/2013 | Caldwell | ................. | H04L 51/22 709/206 |
| 2014/0324999 A1* | 10/2014 | Dan | ........................ | H04L 51/22 709/206 |
| 2016/0028677 A1* | 1/2016 | Narasimhan | ...... | H04W 12/0027 709/203 |
| 2016/0147387 A1* | 5/2016 | Rahman | ................ | G06F 3/0482 715/752 |
| 2016/0182430 A1* | 6/2016 | Sachidanandam | .. | H04M 1/7243 715/752 |
| 2017/0171121 A1* | 6/2017 | Zhang | ..................... | G06F 40/20 |
| 2018/0034756 A1* | 2/2018 | Allen | ...................... | H04L 51/04 |
| 2018/0188907 A1* | 7/2018 | Golembewski | ......... | H04L 51/16 |

(Continued)

FOREIGN PATENT DOCUMENTS

| | | |
|---|---|---|
| CN | 104598476 A | 5/2015 |
| CN | 107566255 A | 1/2018 |

(Continued)

OTHER PUBLICATIONS

Extended European Search report in EP application No. 19212090.5, dated May 18, 2020.

(Continued)

*Primary Examiner* — Glenford J Madamba
(74) *Attorney, Agent, or Firm* — Syncoda LLC; Feng Ma

(57) ABSTRACT

A message processing method includes: acquiring an unread message in the communication software; identifying contents of the unread message to obtain summary information of the unread message; and outputting the summary information.

15 Claims, 6 Drawing Sheets

(56) References Cited

U.S. PATENT DOCUMENTS

2020/0125632 A1* 4/2020 Ning ................. H04L 51/18
2020/0175972 A1* 6/2020 Fan .................. G06F 40/56

FOREIGN PATENT DOCUMENTS

CN 107948428 A 4/2018
CN 109857290 A 6/2019

OTHER PUBLICATIONS

Wark Dredze at al., Generating Summary Keywords for Emails Using Topics, IUI' 08, Jan. 13-16, 2008, Maspalomas, Gran Canaria, Spain.
Mark Harel Dredze, Intelligent Email: Aiding Users with AI, A Dissertation in Computer and Information Science, presented to the Faculties of the University of Pennsylvania, 2009.
First OA for CN application 201910512208.4, mailed on Jun. 23, 2020.
OA for CN application 201910512208.4, mailed on Feb. 3, 2021.

* cited by examiner

MESSAGE PROCESSING METHOD, APPARATUS AND DEVICE

CROSS-REFERENCE TO RELATED APPLICATION

This application claims priority to Chinese Patent Application No. 201910512208.4 filed on Jun. 13, 2019, the disclosure of which is hereby incorporated by reference in its entirety.

BACKGROUND

Instant messaging software has been widely used because of its instant information interacting function. A user can set up a chat group in the instant messaging software to realize chatting among a plurality of users.

SUMMARY

The present disclosure relates generally to the field of computer communication technologies, and more specifically to a message processing method, apparatus and device.

According to a first aspect of embodiments of the present disclosure, there is provided a message processing method for communication software, including: acquiring an unread message in the communication software; identifying contents of the unread message to obtain summary information of the unread message; and outputting the summary information. The unread message includes at least one selected from a text message, an image message, a voice message and a video message.

According to a second aspect of embodiments of the present disclosure, there is provided a message processing apparatus, including: an acquiring module, configured to acquire an unread message in the communication software; an obtaining module, configured to identify contents of the unread message to obtain summary information of the unread message; and an outputting module, configured to output the summary information. The unread message includes at least one selected from a text message, an image message, a voice message and a video message.

According to a third aspect of embodiments of the present disclosure, there is provided a non-transitory computer-readable storage medium having stored therein a computer program that, when executed by a processor, causes the message processing method as described in any embodiment of the first aspect to be executed.

According to a fourth aspect of embodiments of the present disclosure, there is provided a message processing device, including: a processor; and a memory for storing instructions executable by the processor. The processor is configured to: acquire an unread message in the communication software; identify contents of the unread message to obtain summary information of the unread message; and output the summary information. The unread message includes at least one selected from a text message, an image message, a voice message and a video message.

It is to be understood that both the foregoing general description and the following detailed description are explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
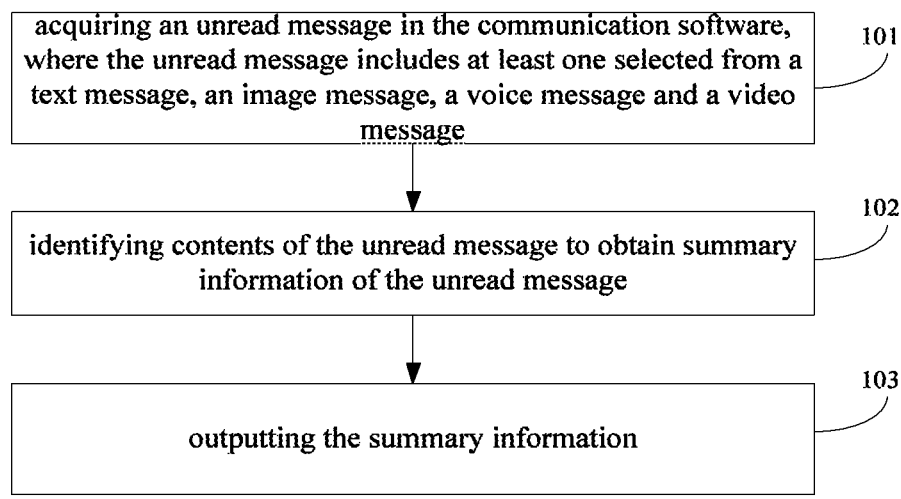
FIG. 1 is a flowchart of a message processing method according to some embodiments of the present disclosure.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

It should be illustrated that, terms used in the present disclosure are only for the purpose of describing specific embodiments, but should not be construed to limit the present disclosure. As used in embodiments of the present disclosure and the appended claims, "a," "an" and "the" in singular forms mean including plural forms as well, unless clearly indicated in the context otherwise. It should also be understood that, as used herein, the term "and/or" represents and contains any one and all possible combinations of one or more associated listed items.

It should be understood that, terms "first," "second" and "third" as used in the description of the present disclosure, the appended claims and drawings are only used for distinguishing various information or different elements, rather than indicating a specific order. For example, without departing from the scope of the present disclosure, the first information may also be referred to as the second information. Similarly, the second information may also be referred to as the first information. Depending on the context, the word "if" as used herein may be interpreted as "when," "in a case that," or "determining . . . in response to."

Because there are a large number of interactive chat messages transmitted by the plurality of users in the chat group, a certain user needs to view these messages before he/she extracts effective information therefrom. Especially for voice messages, the user needs to click icons of multiple voice messages to listen to the contents of the group chatting. The above operations of extracting effective information from the chat group are long time-consuming, cumbersome and inefficient, which is not conducive for the user to quickly start chatting.

According to a first aspect of embodiments of the present disclosure, there is provided a message processing method for communication software, including: acquiring an unread message in the communication software; identifying contents of the unread message to obtain summary information of the unread message; and outputting the summary information. The unread message includes at least one selected from a text message, an image message, a voice message and a video message.

In some embodiments, identifying contents of the unread message to obtain summary information of the unread message includes: identifying the contents of the unread message to obtain at least one topic; and determining summary information for each topic.

In some embodiments, after the summary information is output, the message processing method further includes: detecting a selection operation for the summary information; and displaying in a floating window a target unread message corresponding to the summary information or jumping from a dialog box of the communication software to a message interface including the target unread message, in response to the detected selection operation.

In some embodiments, outputting the summary information includes at least one of:

displaying the summary information in a dialog box of the communication software;

displaying the summary information in a floating window; and voice playing the summary information.

According to a second aspect of embodiments of the present disclosure, there is provided a message processing apparatus, including: an acquiring module, configured to acquire an unread message in the communication software; an obtaining module, configured to identify contents of the unread message to obtain summary information of the unread message; and an outputting module, configured to output the summary information. The unread message includes at least one selected from a text message, an image message, a voice message and a video message.

In some embodiments, the obtaining module includes: an obtaining submodule, configured to identify the contents of the unread message to obtain at least one topic; and a determining submodule, configured to determine summary information for each topic.

In some embodiments, the message processing apparatus further includes:

a detecting module, configured to detect a selection operation for the summary information after the summary information is output; and a responding module, configured to display in a floating window a target unread message corresponding to the summary information or make the communication software jump from a dialog box to a message interface including the target unread message, in response to the detected selection operation.

In some embodiments, the outputting module includes at least one of:

a first displaying submodule, configured to display the summary information in a dialog box of the communication software;

a second displaying submodule, configured to display the summary information in a floating window; and a playing submodule, configured to voice play the summary information.

According to a third aspect of embodiments of the present disclosure, there is provided a non-transitory computer-readable storage medium having stored therein a computer program that, when executed by a processor, causes the message processing method as described in any embodiment of the first aspect to be executed.

According to a fourth aspect of embodiments of the present disclosure, there is provided a message processing device, including: a processor; and a memory for storing instructions executable by the processor. The processor is configured to: acquire an unread message in the communication software; identify contents of the unread message to obtain summary information of the unread message; and output the summary information. The unread message includes at least one selected from a text message, an image message, a voice message and a video message.

Various embodiments of the present disclosure can have one or more of the following advantages.

The communication software can acquire the unread message in the communication software; identifies contents of the unread message to obtain the summary information of the unread message; and outputs the summary information, thereby achieving the automatic generation of the summary information of the unread message. By viewing the summary information automatically output by the communication software, a user can quickly learn the main contents of the unread message in the communication software, which is convenient for the user to quickly start chatting.

Embodiments of the present disclosure provide a method for transmitting messages, which is applicable to a terminal having a message transmitting function. The terminal may be a mobile phone, a tablet computer, a personal digital assistant, etc.

FIG. 1 is a flowchart of a message processing method according to some embodiments of the present disclosure. The method shown in FIG. 1 is applicable to a terminal, and includes the following acts as illustrated at blocks of FIG. 1.

At block 101, an unread message in the communication software is acquired. The unread message includes at least one selected from a text message, an image message, a voice message and a video message.

In embodiments of the present disclosure, the communication software has a message transmitting function. A user is able to send messages via the communication software to contact other people. There are many kinds of communication software, such as instant messaging software, short message software (SMS), etc.

When the communication software is the instant messaging software, the terminal can download the instant messaging software to the local, or access the web version of the instant messaging software. When the communication software is the short message software, the terminal usually downloads the short message software to the local. There are many kinds of terminals, including but not being limited to a mobile phone, a tablet computer, a personal digital assistant, etc.

In this act, the communication software identifies reading statuses of messages in a dialog box. For example, the communication software may identify the reading statuses of messages transmitted in a preset historical period in the dialog box to obtain a reading status identification result. The reading status identification result includes that a message has been read or the message has not been read.

When there is an unread message in the communication software, the communication software will acquire the unread message. The unread message may include at least one selected from a text message, an image message, a voice message and a video message.

When the unread message only includes the text message, the communication software acquires the text message in the unread message. When the unread messages include the text message, the image message, the voice message and the video message, the communication software acquires the unread messages corresponding to the four types of messages.

The communication software is able to detect whether it meets a preset message acquisition condition. When meeting the preset message acquisition condition, the communication software acquires the unread message in the communication software.

There are many kinds of preset message acquisition conditions. For example, the preset message acquisition condition may include at least one of the followings: the number of the unread messages is greater than or equal to a preset number; the dialog box of the communication software is opened; and a preset operation for the communication software is received from the user, where the preset operation is configured to instruct the communication software to execute the act of acquiring the unread message. The preset operation includes but is not limited to a click operation for an option in a display interface, a press operation for an entity key on the terminal, etc.

For example, the preset number is 15, and the communication software determines the number of the unread messages in the communication software itself to be 16. After determining that the number of the unread messages is greater than the preset number, the communication software starts to acquire the unread messages in the communication software.

There are many ways for the communication software to identify the reading status of the message in the dialog box, for example, whether a historical click operation for a displayed item of the message is received at a historical moment. The operation of the communication software to identify the reading status of the message in the dialog box may refer to a related technique, which will not be elaborated herein.

At block 102, contents of the unread message are identified to obtain summary information of the unread message.

After acquiring the unread message, the communication software identifies the contents of the unread message, and summarizes the identified message contents to obtain the summary information of the unread message. The summary information can reflect the main contents of the unread message.

For different kinds of unread messages, the corresponding content identification methods are different.

For example, when the unread message is a text message, the communication software identifies the contents of the text message via text recognition.

When the unread message is an image message, the communication software identifies the contents of the image message via image recognition. For example, an image in the image message is a peony image, and the communication software recognizes the image message via the image recognition to identify the content of the image message as peony. For another example, when the unread message is an image message, the communication software identifies whether the image message contains text information, and takes recognized text information as the content of the image message.

When the unread message is a voice message, the communication software first converts the voice message into a text message, and then obtains the content of the voice message according to the text message.

When the unread message is a video message, and information like the name and summary of the video message are displayed on an interface to be played of the video message, the communication software acquires the information on the interface to be played of the video message, and acquires the content of the video message according to the information.

Figure 2:
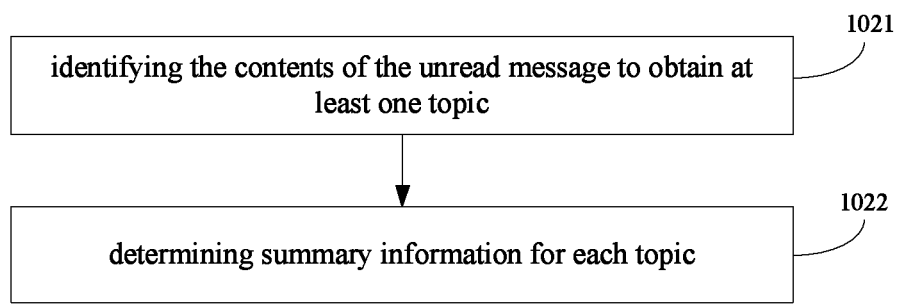
FIG. 2 is a flowchart of a message processing method according to some embodiments of the present disclosure.

In an alternative embodiment, the unread messages acquired by the communication software may be derived from different topics. In such a case, referring to FIG. 2 which illustrates a flowchart of a message processing method according to some embodiments of the present disclosure, the act of identifying contents of the unread message to obtain summary information of the unread message may be realized by the following acts as illustrated at blocks in FIG. 2.

At block 1021, the contents of the unread message are identified so as to obtain at least one topic.

At block 1022, summary information is determined for each topic.

For example, the communication software identifies the contents of the acquired unread messages to determine that the unread messages include an unread message from a "travel" topic and an unread message from a "learning" topic. After that, the communication software acquires a first unread message set from the "travel" topic, and identifies the contents of the first unread message set to obtain summary information of the first unread message set, that is, the summary information is determined for the "travel" topic. Similarly, the communication software acquires a second unread message set from the "learning" topic, and identifies the contents of the second unread message set to obtain summary information of the second unread message set, that is, the summary information is determined for the "learning" topic.

With the settings of acts as illustrated at block 1021 and block 1022, the communication software has functions of identifying the contents of the unread message to obtain at least one topic, and determining the summary information for each topic, thereby enriching the functions of the communication software.

At block 103, the summary information is output.

After obtaining the summary information of the unread message, the communication software outputs the summary information. In this way, the user can quickly learn the main content of the unread message in the communication software, so as to quickly start chatting.

When the summary information is determined for each topic of the unread message, the communication software outputs the summary information determined for each topic.

There are many ways to output the summary information, which include but are not limited to at least one of the followings: displaying the summary information in a dialog box of the communication software; displaying the summary information in a floating window; and voice playing the summary information.

Figure 3:
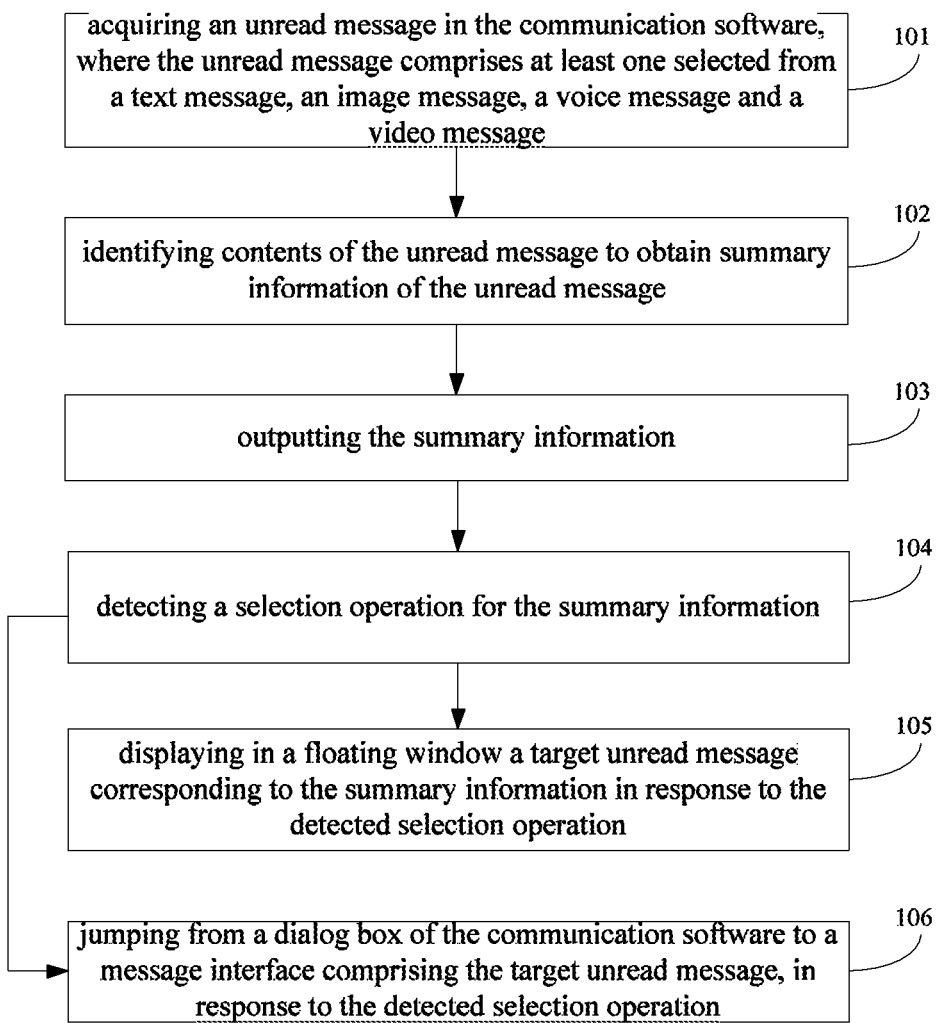
FIG. 3 is a flowchart of a message processing method according to some embodiments of the present disclosure.

In an alternative embodiment, referring to FIG. 3 which shows a flowchart of a message processing method according to some embodiments of the present disclosure, the communication software may further execute the following acts as illustrated at blocks of FIG. 3, after outputting the summary information.

At block 104, a selection operation for the summary information is detected.

At block 105, a target unread message corresponding to the summary information is displayed in a floating window, in response to the detected selection operation.

At block 106, a dialog box of the communication software jumps to a message interface including the target unread message, in response to the detected selection operation.

For the act as illustrated at block 104, after outputting the summary information, the communication software detects the selection operation for the summary information. For example, when a link is set for the summary information, a click operation for the summary information can be detected; when a selection option is set for the summary information, a click operation for the selection option can be detected. The above two detection methods both can be understood as the selection operation for the unread message.

For the act as illustrated at block 105, after detecting the selection operation for the summary information, the communication software acquires the target unread message corresponding to the summary information, and displays the acquired target unread message in a pop-up floating window, so that the user can view the summary information through the floating window.

In some embodiments, when the communication software determines one summary information for all unread messages and outputs the summary information, the target unread messages are all of the unread messages. In some embodiments, the communication software determines the summary information for each of different topics of the unread messages and outputs all the determined summary information. In a case, when the communication software detects the selection operation for a certain summary information, the target unread message is the unread message derived from the topic corresponding to the certain summary information.

For the act as illustrated at block 106, after detecting the selection operation for the summary information, the communication software determines location information of the target unread message corresponding to the summary information in a historical chat record of the communication software, and jumps from the dialog box to the message interface including the target unread message according to the location information, so as to achieve the automatic jump of the message interface of the communication software, which is convenient for the user to view the target unread message through the dialog box.

For example, the summary information is configured with a link, which directs to the position of the target unread message in the historical chat record of the communication software. When the link is clicked, the dialog box of the communication software will jump to the message interface including the target unread message.

After detecting the selection operation for the summary information, the communication software can display the target unread message corresponding to the summary information by executing the act as illustrated at block 105 or 106.

For the sake of simple description, the above embodiments of the message processing method are described as one or more combinations of a series of acts. However, it will be understood by those skilled in the art that embodiments of the present disclosure are not restricted by the sequence of the acts, and some acts may be performed in other sequences or simultaneously based on the descriptions of the present disclosure.

Further, it will be understood by those skilled in the art that the embodiments described in the specification belong to alternative embodiments, and the acts and modules involved therein are not necessarily required by the present disclosure.

Corresponding to the above embodiments of the method for realizing application functions, the present disclosure also provides embodiments of an apparatus and a corresponding terminal for realizing the application functions.

Figure 4:
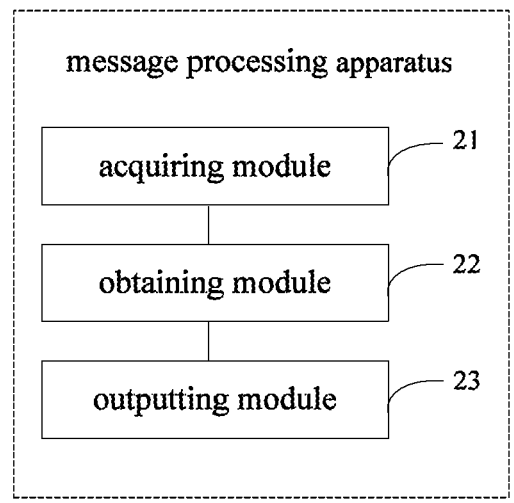
FIG. 4 is a block diagram of a message processing apparatus according to some embodiments of the present disclosure.

FIG. 4 is a block diagram of a message processing apparatus according to some embodiments of the present disclosure, which is applicable to a terminal. The message processing apparatus includes: an acquiring module 21, an obtaining module 22, and an outputting module.

The various device components, units, blocks, or portions may have modular configurations, or are composed of discrete components, but nonetheless can be referred to as "modules" in general. In other words, the "components," "modules" or "units" referred to herein may or may not be in modular forms.

The acquiring module 21 is configured to acquire an unread message in the communication software. The unread message includes at least one selected from a text message, an image message, a voice message and a video message.

The obtaining module 22 is configured to identify contents of the unread message to obtain summary information of the unread message.

The outputting module 23 is configured to output the summary information.

Figure 5:
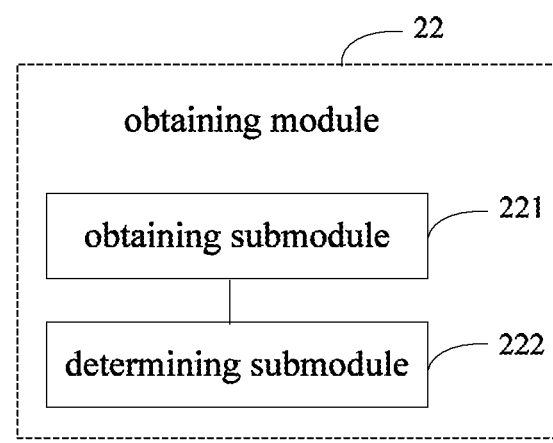
FIG. 5 is a block diagram of a message processing apparatus according to some embodiments of the present disclosure.

On the basis of the embodiment of the message processing apparatus shown in FIG. 4, the present disclosure further provides an alternative embodiment of the message processing apparatus. FIG. 5 is a block diagram of a message processing apparatus according to an alternative embodiment of the present disclosure, as shown in FIG. 5, the obtaining module 22 may include: an obtaining submodule 221, and a determining submodule 222.

The obtaining submodule 221 is configured to identify the contents of the unread message to obtain at least one topic.

The determining submodule 222 is configured to determine summary information for each topic.

Figure 6:
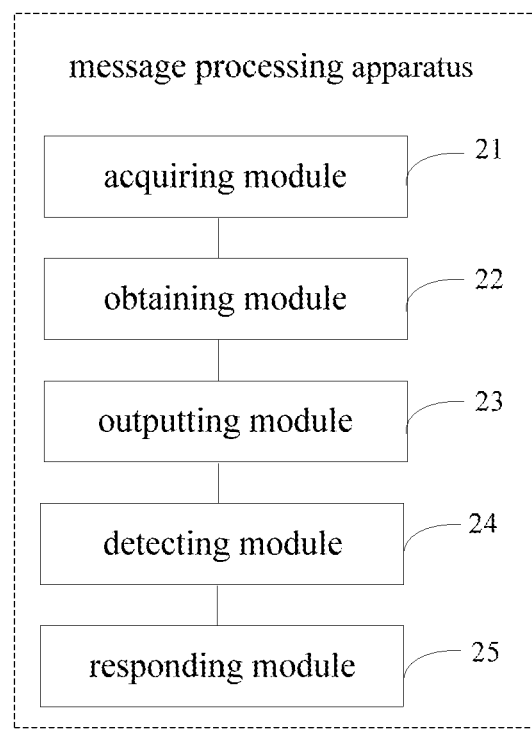
FIG. 6 is a block diagram of a message processing apparatus according to some embodiments of the present disclosure.

On the basis of the embodiment of the message processing apparatus shown in FIG. 4, the present disclosure further provides an alternative embodiment of the message processing apparatus. FIG. 6 is a block diagram of a message processing apparatus according to an alternative embodiment of the present disclosure, as shown in FIG. 6, the message processing apparatus may further include: a detecting module 24 and a responding module 25.

The detecting module 24 is configured to detect a selection operation for the summary information after the summary information is output.

The responding module 25 is configured to display in a floating window a target unread message corresponding to the summary information or make the communication software jump from a dialog box to a message interface including the target unread message, in response to the detected selection operation.

On the basis of the embodiment of the message processing apparatus shown in FIG. 4, the present disclosure further provides an alternative embodiment of the message processing apparatus. In the alternative embodiment, the outputting module 23 may include at least one of a first displaying submodule, a second displaying submodule, and a playing submodule.

The first displaying submodule is configured to display the summary information in a dialog box of the communication software.

The second displaying submodule is configured to display the summary information in a floating window.

The playing submodule is configured to voice play the summary information.

With respect to the embodiments of the message processing apparatus, as they may correspond to the embodiments of the message processing method, reference can be made to the relevant descriptions of the embodiments of the message processing method. The above-described embodiments of the message processing apparatus are explanatory, in which the units/modules described above as separated components may be or may not be physically separated, and the components displayed as units may be or may not be physical units, that is, they can be located in a place or distributed to a plurality of network units. A part or all of the modules can be selected to achieve the purpose of the present disclosure according to the actual needs, which can be understand and implemented by those skilled in the art without creative labor.

Correspondingly, in another aspect, embodiments of the present disclosure provide a message processing device, including: a processor; and a memory for storing instructions executable by the processor. The processor is configured to: acquire a set of messages transmitted in a communication dialog box of communication software, after the communication software meets a preset message acquisition condition; and semantically summarize the set of messages to generate semantic information of the set of messages.

Figure 7:
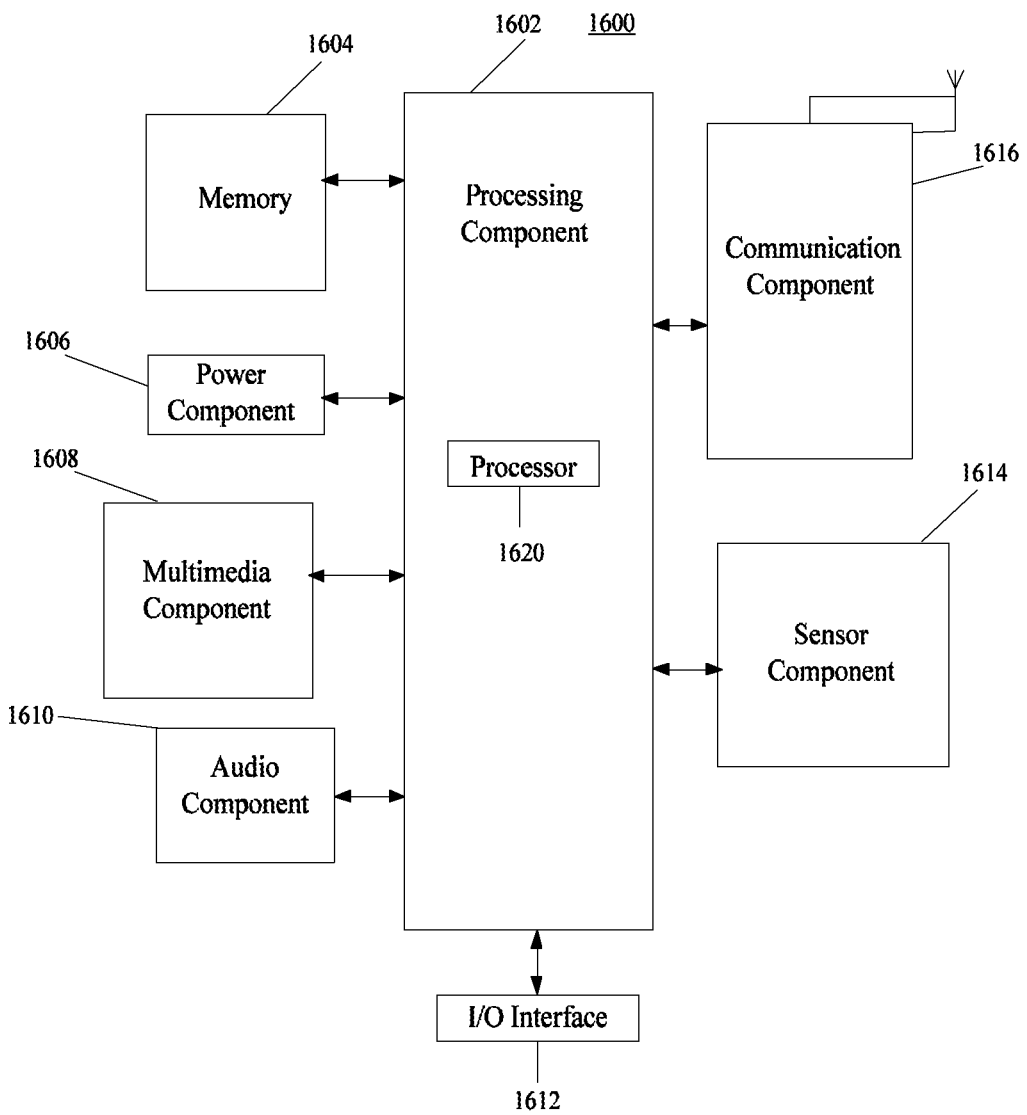
FIG. 7 is a schematic diagram of a message processing device according to some embodiments of the present disclosure.

FIG. 7 is a schematic diagram of a message processing device 1600 according to some embodiments of the present disclosure. For example, the device 1600 may be a user device, which may include a mobile phone, a computer, a digital broadcast terminal, a messaging device, a gaming console, a tablet, a medical device, exercise equipment, a personal digital assistant, a wearable device such as a smart watch, smart glasses, a smart bracelet, smart running shoes, and the like.

Referring to FIG. 7, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 includes a screen providing an output interface between the device 1600 and the user. In some embodiments, the screen may include a liquid crystal display (LCD) and a touch panel (TP). In some embodiments, the screen can be other types of displays, such as organic light-emitting diode (OLED) displays.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the device 1600 is in an operation mode, such as a call mode, a recording mode, and a voice recognition mode.

In some embodiments, for example, the summary information can be textual information recognized through voice recognition. As such, in some situations such as in a noisy environment or where privacy is of concern, the user can see view a quick textual summary of unread group chat messages including voice messages, rather than switching between reading the text messages and listening to the voice messages.

The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the device 1600. For instance, the sensor component 1614 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the device 1600 and other devices. The device 1600 can access a wireless network based on a communication standard, such as Wi-Fi, 2G, 3G, 4G, 5G or a combination thereof. In some embodiments, the communication component 1616 receives a broadcast signal or broadcast associated information from an external broadcast management system via a broadcast channel. In some embodiments, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium, such as the memory 1604 including instructions. The instructions in the storage medium, when executed by the processor 1620 in the device 1600, cause the device 1600 to perform a message processing method, including: acquiring an unread message in the communication software; identifying contents of the unread message to obtain summary information of the unread message; and outputting the summary information. The unread message comprises at least one selected from a text message, an image message, a voice message and a video message.

For example, the non-transitory computer-readable storage medium may be a ROM, a random access memory (RAM), a CD-ROM, a magnetic tape, a floppy disc, an optical data storage device, and the like.

Figure 8:
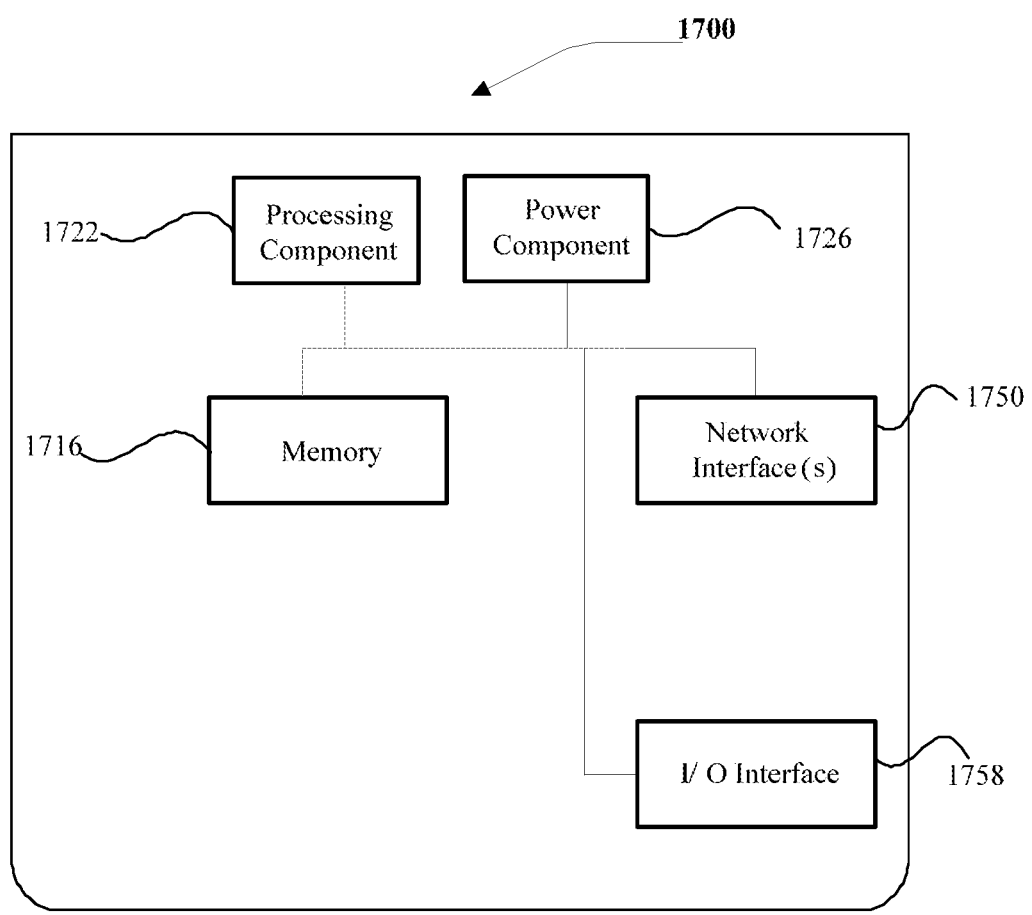
FIG. 8 is a schematic diagram of a message processing device according to some embodiments of the present disclosure.

FIG. 8 is a block diagram of a message processing device 1700 according to some embodiments of the present disclosure. For example, the device 1700 may be provided as an application server. Referring to FIG. 8, the device 1700 includes a processing component 1722 (e.g. one or more processors), and a memory resource represented by a memory 1716 for storing instructions like application programs executable by the processing component 1722. The application programs stored in memory 1716 may include one or more modules each corresponding to a set of instructions. In addition, the processing component 1722 is configured to execute instructions to perform the message processing method as described above.

The device 1700 may further include a power component 1726 configured to execute power management of the device 1700, a wired or wireless network interface 1750 configured to connect the device 1700 to the network, and an input/output (I/O) interface 1758. The device 1700 can operate an operating system stored in the memory 1716, such as Android, iOS, Windows Server™, Mac OS X™, Unix™, Linux™ FreeBSD®, and the like.

In some embodiments, there is also provided a non-transitory computer-readable storage medium including instructions, such as included in the memory 1716, executable by the processing component 1722 in the device 1700, for performing the above-described methods. For example, the non-transitory computer-readable storage medium may be a ROM, a RAM, a CD-ROM, a magnetic tape, a floppy disc, an optical data storage device, and the like.

The instructions in the memory 1716, when executed by the processing component 1722, cause the device 1700 to perform a message processing method, including: acquiring an unread message in the communication software; identifying contents of the unread message to obtain summary information of the unread message; and outputting the summary information. The unread message comprises at least one selected from a text message, an image message, a voice message and a video message.

In the present disclosure, it is to be understood that the terms "lower," "upper," "front," "back," "left," "right," "top," "bottom," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the methods and operations can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A message processing method for communication software, comprising:
   acquiring an unread message in the communication software;
   determining a type of the unread message, identifying contents of the unread message to obtain at least one topic, and determining summary information for each topic, wherein the summary information is text information and comprises main contents of the unread message, wherein
      upon determining that the unread message is a text message, identifying contents of the unread message comprises identifying contents of the text message via text recognition;
      upon determining that the unread message is an image message, identifying contents of the unread message comprises identifying contents of the image message via image recognition, or taking recognized text information as the contents of the image message if the image message contains text information;
      upon determining that the unread message is a voice message, identifying contents of the unread message comprises converting the voice message into a text message, and obtaining contents of the voice message according to the text message;
      upon determining that the unread message is a video message, identifying contents of the unread message comprises acquiring information on an interface to be played of the video message, and acquiring contents of the video message according to the information, wherein the information comprises a name and a summary of the video message;
   outputting the summary information through at least one of audio and image signals;
   detecting a selection operation for the summary information; and
   jumping from a dialog box of the communication software to a message interface comprising a target unread message corresponding to the summary information, in response to the detected selection operation; wherein the target unread message is an unread message derived from a topic corresponding to a certain summary information;
   wherein the communication software is a chat application, and the method further comprises:
   automatically generating and outputting the summary information to thereby facilitate a user learning the main contents of the unread message and starting chatting with a reduced time.

2. The message processing method according to claim 1, further comprising, after the outputting the summary information:
   detecting a selection operation for the summary information; and
   displaying in a floating window a target unread message corresponding to the summary information, in response to the detected selection operation.

3. The message processing method according to claim 1, wherein the outputting the summary information comprises at least one of:
  displaying the summary information in a dialog box of the communication software;
  displaying the summary information in a floating window; or
  voice playing the summary information.

4. The message processing method according to claim 1, further comprising, prior to the acquiring the unread message in the communication software:
  identifying reading statuses of messages transmitted in a preset historical period of the communication software.

5. The message processing method according to claim 1, further comprising, prior to the acquiring the unread message in the communication software: identifying whether a preset message acquisition condition is met,
  wherein the preset message acquisition condition comprises at least one of:
  the number of the unread messages is greater than or equal to a preset number;
  a dialog box of the communication software is opened; or
  a preset operation for the communication software is received, where the preset operation is configured to instruct the communication software to acquire the unread message;
  wherein the unread message comprises a voice message; and
  wherein the summary information comprises a textual summary of the voice message via voice recognition.

6. A non-transitory computer-readable storage medium having stored therein a computer program for execution by a processor to causes a message processing method to be executed, the method comprising:
  acquiring an unread message in the communication software;
  determining a type of the unread message, identifying contents of the unread message to obtain at least one topic, and determining summary information for each topic, wherein the summary information is text information and comprises main contents of the unread message, wherein
    upon determining that the unread message is a text message, identifying contents of the unread message comprises identifying contents of the text message via text recognition;
    upon determining that the unread message is an image message, identifying contents of the unread message comprises identifying contents of the image message via image recognition, or taking recognized text information as the contents of the image message if the image message contains text information;
    upon determining that the unread message is a voice message, identifying contents of the unread message comprises converting the voice message into a text message, and obtaining contents of the voice message according to the text message;
    upon determining that the unread message is a video message, identifying contents of the unread message comprises acquiring information on an interface to be played of the video message, and acquiring contents of the video message according to the information, wherein the information comprises a name and a summary of the video message;
  outputting the summary information through at least one of audio and image signals;
  detecting a selection operation for the summary information; and
  jumping from a dialog box of the communication software to a message interface comprising a target unread message corresponding to the summary information, in response to the detected selection operation; wherein the target unread message is an unread message derived from a topic corresponding to a certain summary information;
  wherein the communication software is a chat application, and the method further comprises:
  automatically generating and outputting the summary information to thereby facilitate a user learning the main contents of the unread message and starting chatting with a reduced time.

7. The non-transitory computer-readable storage medium according to claim 6, wherein the message processing method further comprises:
  detecting a selection operation for the summary information, after outputting the summary information; and
  displaying in a floating window a target unread message corresponding to the summary information in response to the detected selection operation.

8. The non-transitory computer-readable storage medium according to claim 6, wherein outputting the summary information comprises at least one of:
  displaying the summary information in a dialog box of the communication software;
  displaying the summary information in a floating window; or
  voice playing the summary information.

9. The non-transitory computer-readable storage medium according to claim 6, wherein the message processing method further comprises, prior to the acquiring the unread message in the communication software:
  identifying reading statuses of messages transmitted in a preset historical period of the communication software.

10. The non-transitory computer-readable storage medium according to claim 6, wherein the message processing method further comprises, prior to the acquiring the unread message in the communication software: identifying whether a preset message acquisition condition is met,
  wherein the preset message acquisition condition comprises at least one of:
  the number of the unread messages is greater than or equal to a preset number;
  a dialog box of the communication software is opened; or
  a preset operation for the communication software is received, where the preset operation is configured to instruct the communication software to acquire the unread message.

11. A message processing device, comprising:
  a processor; and
  a memory for storing instructions executable by the processor;
  wherein the processor is configured to:
  acquire an unread message in the communication software;
  determine a type of the unread message, identify contents of the unread message to obtain at least one topic, and determine summary information for each topic, wherein the summary information is text information and comprises main contents of the unread message, wherein the processor is further configured to upon determining that the unread message is a text message, identify contents of the unread message by identifying contents of the text message via text recognition;

upon determining that the unread message is an image message, identify contents of the unread message by identifying contents of the image message via image recognition, or taking recognized text information as the contents of the image message if the image message contains text information;

upon determining that the unread message is a voice message, identify contents of the unread message by converting the voice message into a text message, and obtaining contents of the voice message according to the text message;

upon determining that the unread message is a video message, identify contents of the unread message comprises by information on an interface to be played of the video message, and acquiring contents of the video message according to the information, wherein the information comprises a name and a summary of the video message; and output the summary information through at least one of audio and image signals, detect a selection operation for the summary information; and jump from a dialog box of the communication software to a message interface comprising a target unread message corresponding to the summary information, in response to the detected selection operation; wherein the target unread message is an unread message derived from a topic corresponding to a certain summary information;

wherein the communication software is a chat application, and the processor is further configured to:

automatically generate and output the summary information to thereby facilitate a user learning the main contents of the unread message and starting chatting with a reduced time.

12. The message processing device according to claim 11, wherein the processor is further configured to, after outputting the summary information:

detect a selection operation for the summary information; and display in a floating window a target unread message corresponding to the summary information, or make the communication software jump from a dialog box to a message interface comprising the target unread message, in response to the detected selection operation.

13. The message processing device according to claim 11, wherein the processor is configured to output the summary information by at least one of:

displaying the summary information in a dialog box of the communication software;

displaying the summary information in a floating window; or voice playing the summary information.

14. The message processing device according to claim 13, wherein the processor is further configured to, prior to the acquiring the unread message in the communication software:

identify reading statuses of messages transmitted in a preset historical period of the communication software.

15. The message processing device according to claim 11, wherein the processor is further configured to, prior to the acquiring the unread message in the communication software, identify whether a preset message acquisition condition is met, wherein the preset message acquisition condition comprises at least one of:

the number of the unread messages is greater than or equal to a preset number;

a dialog box of the communication software is opened; or a preset operation for the communication software is received, where the preset operation is configured to instruct the communication software to acquire the unread message.

* * * * *